United States Patent
Descarries et al.

(10) Patent No.: US 9,812,901 B2
(45) Date of Patent: Nov. 7, 2017

(54) EMERGENCY LIGHTING BATTERY CHARGER

(71) Applicant: Thomas & Betts International, LLC, Wilmington, DE (US)

(72) Inventors: Camille Descarries, Montreal (CA); David Perreault, Laval (CA)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 14/940,748

(22) Filed: Nov. 13, 2015

(65) Prior Publication Data

US 2016/0141915 A1    May 19, 2016

Related U.S. Application Data

(60) Provisional application No. 62/081,875, filed on Nov. 19, 2014.

(51) Int. Cl.
*H02J 9/06* (2006.01)
*H02J 7/04* (2006.01)
*H02J 7/00* (2006.01)

(52) U.S. Cl.
CPC ............... *H02J 9/065* (2013.01); *H02J 7/04* (2013.01); *H02J 7/007* (2013.01); *H02J 7/0073* (2013.01); *H02J 2007/0037* (2013.01)

(58) Field of Classification Search
CPC .............. B60Q 3/0293; G01R 31/3648; G01R 31/3679; G06F 1/30; G08B 29/12; H01M 10/44; H01M 10/441; H01M 10/46; H01M 10/48; H01M 10/482; H02J 3/00; H02J 3/32; H02J 7/00; H02J 7/0004; H02J 7/0011; H02J 7/0016; H02J 7/0018; H02J 7/0021; H02J 7/0022; H02J 7/0024; H02J 7/0029; H02J 7/0031; H02J 7/0047; H02J 7/0052; H02J 7/0063; H02J 7/0065; H02J 7/007; H02J 7/0073; H02J 7/0075; H02J 7/0077; H02J 7/0078; H02J 7/008; H02J 7/0083; H02J 7/0091; H02J 7/02; H02J 7/04; H02J 7/041; H02J 7/045; H02J 7/047; H02J 9/00; H02J 9/005; H02J 9/02;

(Continued)

(56) References Cited

U.S. PATENT DOCUMENTS 3,457,489 A    7/1969  Gentry, Jr. et al.
3,465,230 A    9/1969  Ball (Continued)

*Primary Examiner* — Alexander H Taningco
*Assistant Examiner* — Seokjin Kim
(74) *Attorney, Agent, or Firm* — Taft Stettinius & Hollister LLP

(57) ABSTRACT

An emergency lighting power supply includes a rechargeable battery; ballast circuitry configured to supply power to an external light, battery charging circuitry configured to charge the battery, and a controller. The controller determines an amount of time the rechargeable battery has discharged to supply power, via the ballast circuitry, to the external light. If the amount of time is less than a threshold, the controller causes the battery charging circuitry to supply a first current to charge the battery for a first charging period that is proportional to the amount of time, and causes the battery charging circuitry to supply a second current to charge the battery subsequent to the end of the first charging period.

8 Claims, 13 Drawing Sheets

(58) Field of Classification Search
CPC . H02J 9/061; H02J 9/062; H02J 9/065; H04B 10/27; H04B 10/272; H05B 33/0815; H05B 33/0845; H05B 33/0884; H05B 33/0893; H05B 37/04; H05B 39/044; H05B 41/2985
USPC .................. 320/124–167; 307/150, 152, 157
See application file for complete search history.

(56) References Cited

U.S. PATENT DOCUMENTS

| | | | |
|---|---|---|---|
| 3,887,858 A | 6/1975 | Burkett et al. | |
| 3,911,350 A | 10/1975 | Swope | |
| 4,297,630 A | 10/1981 | Mullersman | |
| 4,388,582 A | 6/1983 | Saar et al. | |
| 4,392,101 A | 7/1983 | Saar et al. | |
| 4,394,611 A * | 7/1983 | Fallon ................... | H02J 7/0073 320/139 |
| 4,629,965 A | 12/1986 | Fallon et al. | |
| 4,742,290 A | 5/1988 | Sutphin et al. | |
| 5,204,611 A | 4/1993 | Nor et al. | |
| 5,248,928 A | 9/1993 | Gilmore | |
| 5,352,969 A | 10/1994 | Gilmore et al. | |
| 5,497,067 A | 3/1996 | Shaw | |
| 5,523,668 A * | 6/1996 | Feldstein ............... | H02J 7/0018 320/118 |
| 5,589,755 A | 12/1996 | Kaite et al. | |
| 5,617,006 A | 4/1997 | Lenhart et al. | |
| 5,617,007 A | 4/1997 | Keidl et al. | |
| 5,646,502 A | 7/1997 | Johnson | |
| 5,680,031 A | 10/1997 | Pavlovic et al. | |
| 5,739,639 A | 4/1998 | Johnson | |
| 5,998,968 A | 12/1999 | Pittman et al. | |
| 6,252,373 B1 | 6/2001 | Stefansson et al. | |
| 6,476,585 B1 | 11/2002 | Simmonds | |
| 6,495,992 B1 | 12/2002 | Pavlovic | |
| 6,502,044 B1 * | 12/2002 | Lane ...................... | H02J 7/0029 363/101 |
| 6,930,469 B2 | 8/2005 | Krieger et al. | |
| 8,237,412 B2 | 8/2012 | Johnson et al. | |
| 8,310,205 B1 * | 11/2012 | Hamburgen .......... | H02J 7/0073 320/107 |
| 8,629,574 B2 | 1/2014 | Porter et al. | |
| 9,608,443 B2 * | 3/2017 | Chung .................... | H02J 3/00 |
| 2007/0145949 A1 * | 6/2007 | Matsushima ............. | H02J 7/00 320/132 |
| 2011/0025258 A1 | 2/2011 | Kim et al. | |
| 2011/0043040 A1 * | 2/2011 | Porter ................... | H02J 7/0024 307/66 |
| 2011/0091203 A1 * | 4/2011 | Hughes .................. | H04B 10/27 398/17 |
| 2011/0208370 A1 * | 8/2011 | Lee .......................... | G06F 1/30 700/297 |
| 2015/0008867 A1 * | 1/2015 | Smychkovich ........ | H02J 7/0052 320/107 |
| 2015/0015076 A1 * | 1/2015 | Park ...................... | H02J 7/0018 307/66 |
| 2015/0067379 A1 * | 3/2015 | Tashima ............. | G01R 31/3679 713/340 |
| 2015/0318726 A1 * | 11/2015 | Luo ..................... | H01M 10/441 320/134 |

* cited by examiner

EMERGENCY LIGHTING BATTERY CHARGER

CROSS-REFERENCE TO RELATED APPLICATION

This application claims priority under 35 U.S.C. §119, based on U.S. Provisional Application No. 62/081,875, filed Nov. 19, 2014, the disclosure of which is hereby incorporated by reference herein.

BACKGROUND

Fluorescent lamps use phosphors excited by electrons to create light. Fluorescent lamps ionize mercury vapor in a glass tube which causes electrons in the gas to emit photons at ultraviolet (UV) frequencies. The UV light is converted into visible light using a phosphor coating on the inside of the glass tube. The most common fluorescent lamp is a hot cathode lamp. A hot cathode lamp includes a glass tube filled with an inert gas (e.g, argon) at low pressure. An electrode is located on each side of the glass tube. A ballast regulates alternating current (AC) power that is applied to the electrodes. In certain applications where light from fluorescent lamps may be required even during power outages, power supplies with battery back-up have been implemented to power the lamps during power outages. Nickel Cadmium (NiCad) batteries are typically used in fluorescent light back-up power supplies.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Emergency fluorescent lights, which are powered by back-up batteries during power outages, require battery recharges to maintain the back-up batteries in operable condition. Underwriter Laboratories (UL) rules require that rechargeable batteries in emergency lighting be recharged by a charging current level that is at the very limit of the battery trickle charge manufacturer-recommended-specification. Charging back-up batteries at this level results in a continuous battery overcharge. Continuous battery overcharge, combined with high operating temperatures, substantially reduces the expected life of the back-up battery. Most emergency fluorescent lights include the battery installed in a sealed unit and, therefore, a defective battery necessitates the disposal of the entire lighting unit.

Exemplary embodiments described herein implement a fluorescent power supply that can recharge a back-up emergency battery using either a high charging rate or a low charging rate, where one of at least two different charging periods may be selected for the high charging rate. Subsequent to battery discharge due to input power failure, or due to system testing, the fluorescent power supply described herein can recharge the battery at a high charging rate during a timed period that is a function of the battery discharge time. In one implementation the timed period is proportional to the battery discharge time. In one example, the timed period for charging the battery at the high charging rate is at least one minute, but not longer than 26 hours. After the timed period has elapsed for the high charging rate, the fluorescent power supply lowers the charging current level to a low charging rate that satisfies the requirements of minimum battery charging current and minimum current to hold relay contacts, that connect charging circuitry to the battery, in a closed position. Charging the battery in the manner described herein will increase the expected life of the battery and, thus, the long term reliability of the fluorescent power supply for providing emergency battery backup for fluorescent lighting. Additionally, exemplary embodiments described herein may be integrated into a product without substantial change in the topology of the existing electronic circuitry.

Figure 1:
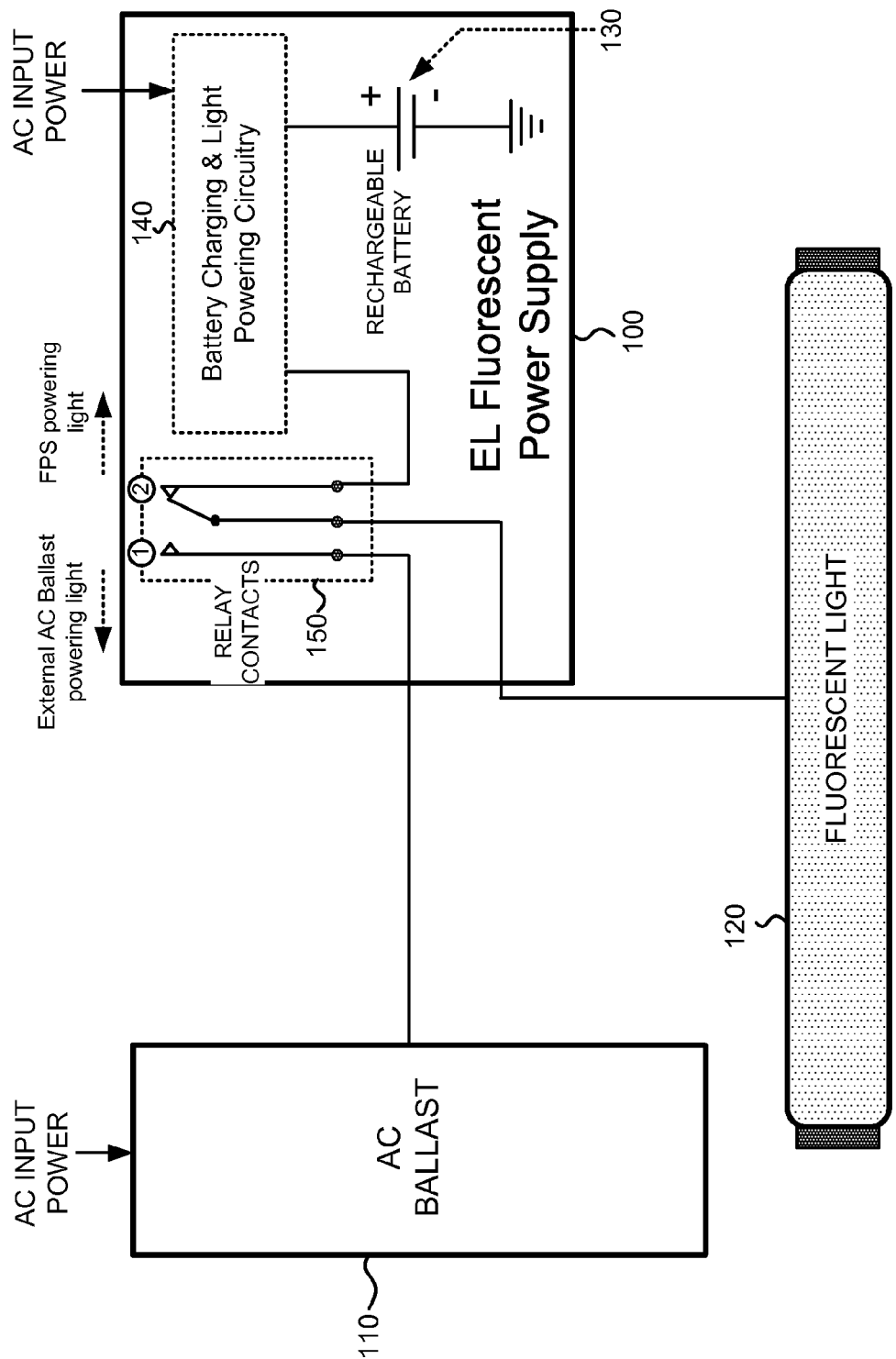
FIG. 1 is a diagram that illustrates an overview of an exemplary emergency lighting fluorescent power supply that may be used, in conjunction with an external ballast, for powering a fluorescent light.

FIG. 1 depicts an overview of an exemplary emergency lighting (EL) fluorescent power supply (FPS) 100 that may be used, in conjunction with an external ballast 110, for powering a fluorescent light 120 when external AC input power is present, or when it has failed. As described herein, and depicted in FIG. 1, fluorescent power supply 100 may include a rechargeable battery 130, battery charging and light powering circuitry 140, and relay contacts 150. When AC input power is supplied to fluorescent power supply 100 and AC ballast 110, relay coils (not shown) within circuitry 140 cause relay contacts 150 to switch to connect ballast 110 to fluorescent light 120 such that ballast 110 regulates the application of the AC input power to light 120. When AC input power fails, or is at least temporarily interrupted, relays within circuitry 140 cause relay contacts 150 to switch to connect battery 130, via circuitry 140, to fluorescent light 120 such that battery 130 supplies power to light 120 via circuitry 140.

After battery 130 has discharged during a discharge period because of failure of the AC input power, and when the AC input power resumes, circuitry 140 recharges battery 130 using one of at least two different charging rates, as described in further detail below. One of the charging rates includes a high charging rate where current at a high rate is supplied to battery 130 to recharge the battery. Another of the charging rates includes a low charging rate where current at a low rate is supplied to battery 130 to recharge the battery. In one implementation, current at the high rate is supplied to battery 130 by circuitry 140 for a charging period that is proportional to the discharge period of battery 130. For example, current at the high rate may be supplied to battery 130 by circuitry 140 for a first charging period that is equal to a fixed factor multiplied by the discharge period (in minutes). If the discharge period exceeds, or is equal to, a time threshold (e.g., in minutes), then current at the high rate may be supplied to battery 130 by circuitry 140 for a second charging period that equals a designated maximum recharge time (e.g., 26 hours). After expiration of the charging period, current at the low charging rate may continue to be supplied to battery 130 by circuitry 140.

Figure 2:
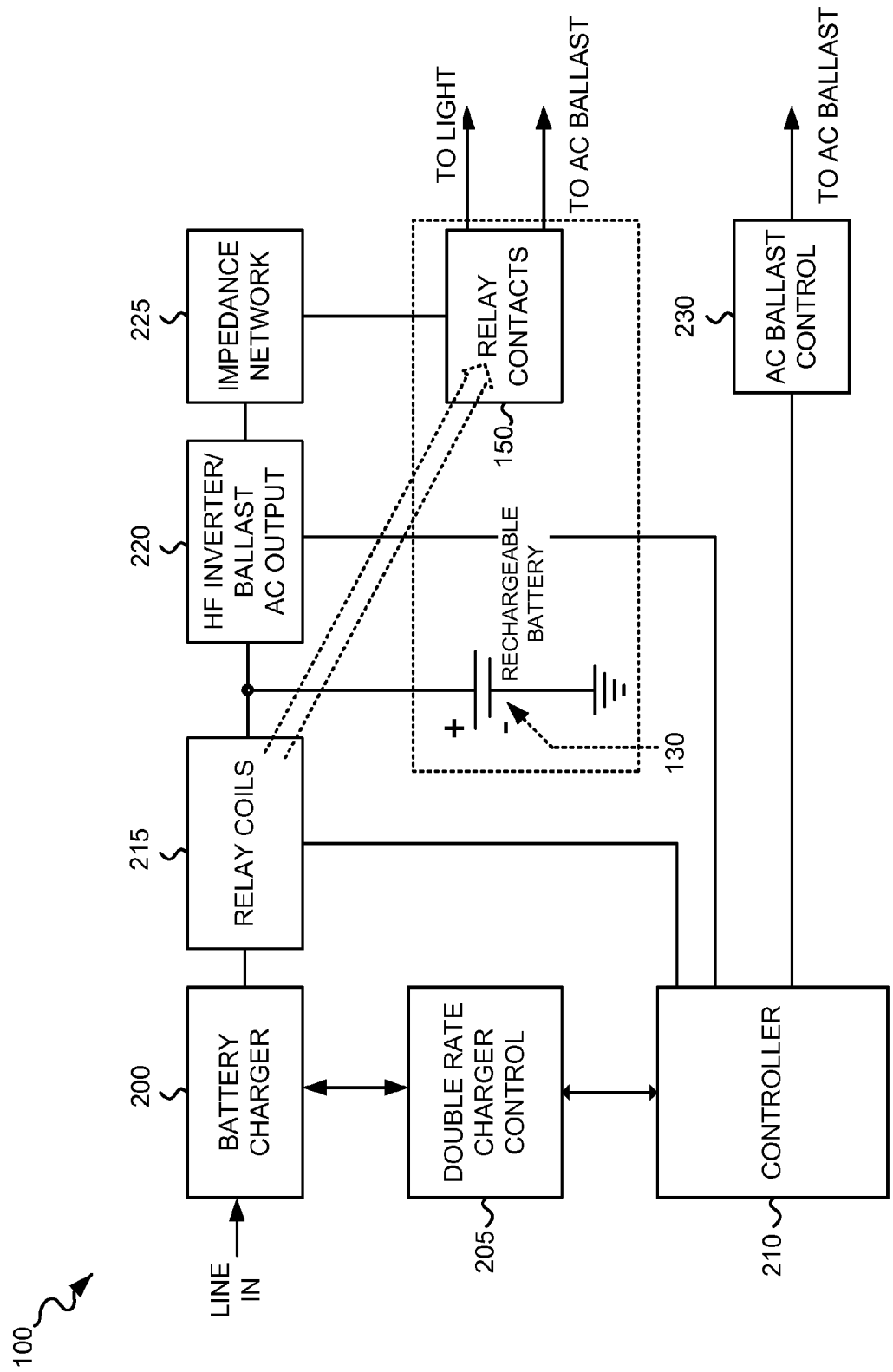
FIG. 2 is a diagram that depicts an exemplary implementation of the fluorescent power supply of FIG. 1.

FIG. 2 depicts an exemplary implementation of fluorescent power supply (FPS) 100. As shown, FPS 100 includes a battery charger 200, a double rate charger control circuitry 205, a controller 210, relay coils 215, a high frequency (HF) inverter/ballast AC output circuitry 220, an impedance network 225, and AC ballast control circuitry 230. Battery charging and light powering circuitry 140 of FIG. 1 may include components 200, 205, 210, 215, 220, 225 and 230 FPS 100 may additionally include rechargeable battery 130 and relay contacts 150 that, as depicted in FIG. 1, may not be included in circuitry 140.

Battery charger 200 includes circuitry for supplying charging current to battery 130. Double rate charger control circuitry 205 controls an amount of charging current that is supplied to battery 130 via battery charger 200. In one implementation, circuitry 205 may enable a high rate of charging current or a low rate of charging current to be supplied to battery 130 via battery charger 200 for charging periods controlled by controller 210.

Controller 210 may include a processor, microprocessor, a microcontroller, or processing logic that performs processes, such as the exemplary process described below with respect to FIGS. 11-13. In implementations where controller 210 includes a processor, microprocessor or a microcontroller, controller 210 may interpret and execute instructions to perform the processes.

Relay coils 215 may, based on voltage and current supplied by battery charger 200, cause relay contacts 130 to engage, connecting AC ballast 110 to power fluorescent light 120 while FPS 100 may charge battery 130. When battery charger 200 removes the voltage and current from relay coils 215 (e.g., due to AC input power failure), relay contacts 130 disengage, connecting FPS 100 to power fluorescent light 120 instead of AC ballast 110. HF inverter/ballast AC output circuitry 220 includes circuitry for FPS 100 to supply power to fluorescent light 120 via impedance network 225. Impedance network 225 includes circuitry for controlling the light output level of fluorescent light 120. AC ballast control circuitry 230 includes circuitry for turning on or off external AC ballast 110.

Figure 3:
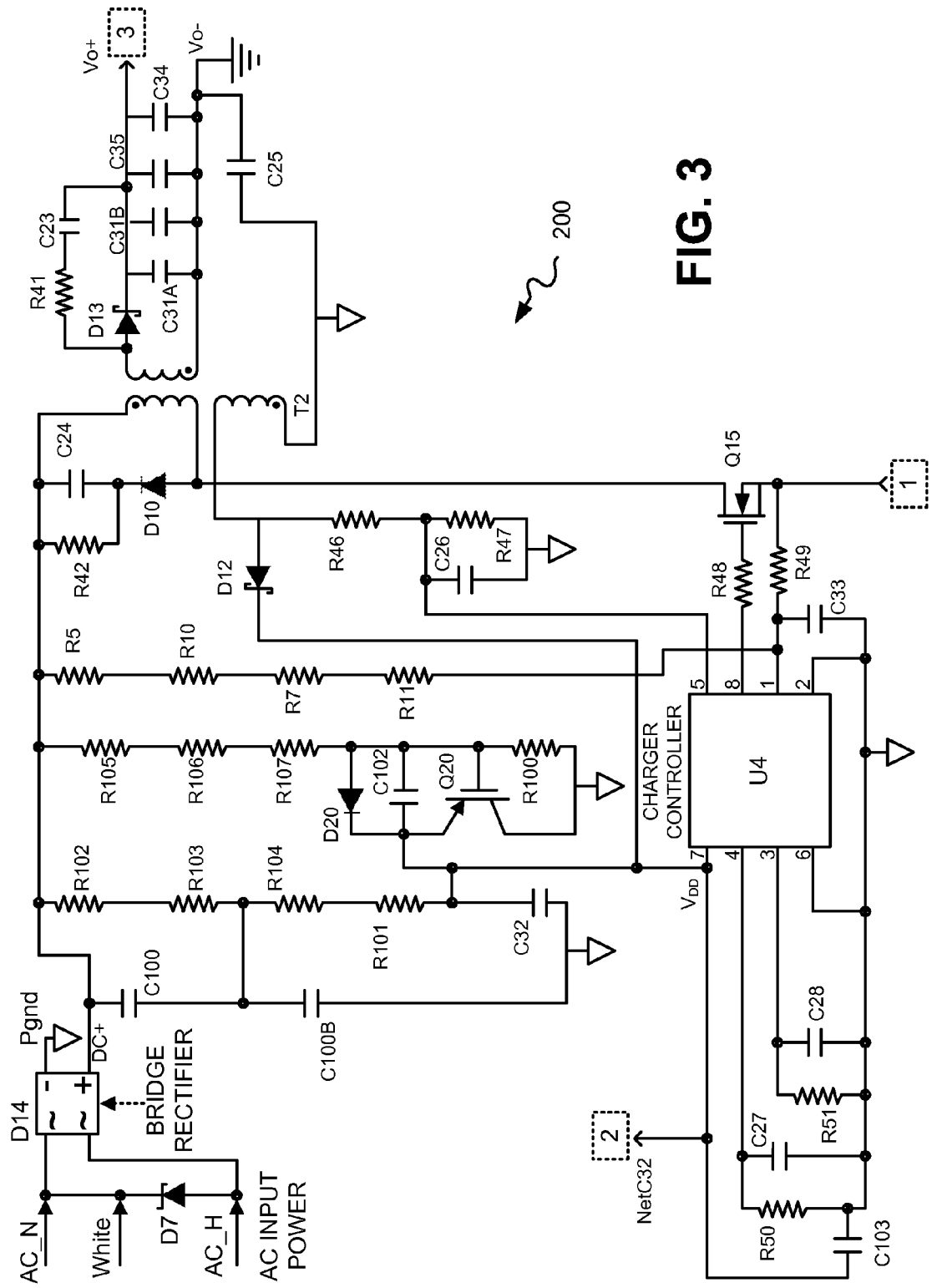
FIG. 3 is a diagram that depicts details of the circuitry of an exemplary implementation of the battery charger of FIG. 2.

FIG. 3 depicts details of the circuitry of an exemplary implementation of battery charger 200. As shown, AC input power (AC_N, White, AC_H) is received as an input to bridge rectifier D14 which converts the AC voltage to a DC voltage DC+. Charger controller U4 receives the rectified AC input power as a DC input voltage ($V_{DD}$) at pin 7 via resistors R102, R103, R104, R101 and capacitors C32 and C103. In one implementation, charger controller U4 may include a FAN100 Pulse Width Modulated (PWM) controller (Fairchild Semiconductor) that serves as a power supply constant-voltage (CV) and constant-current (CC) control unit for FPS 100.

Figure 4:
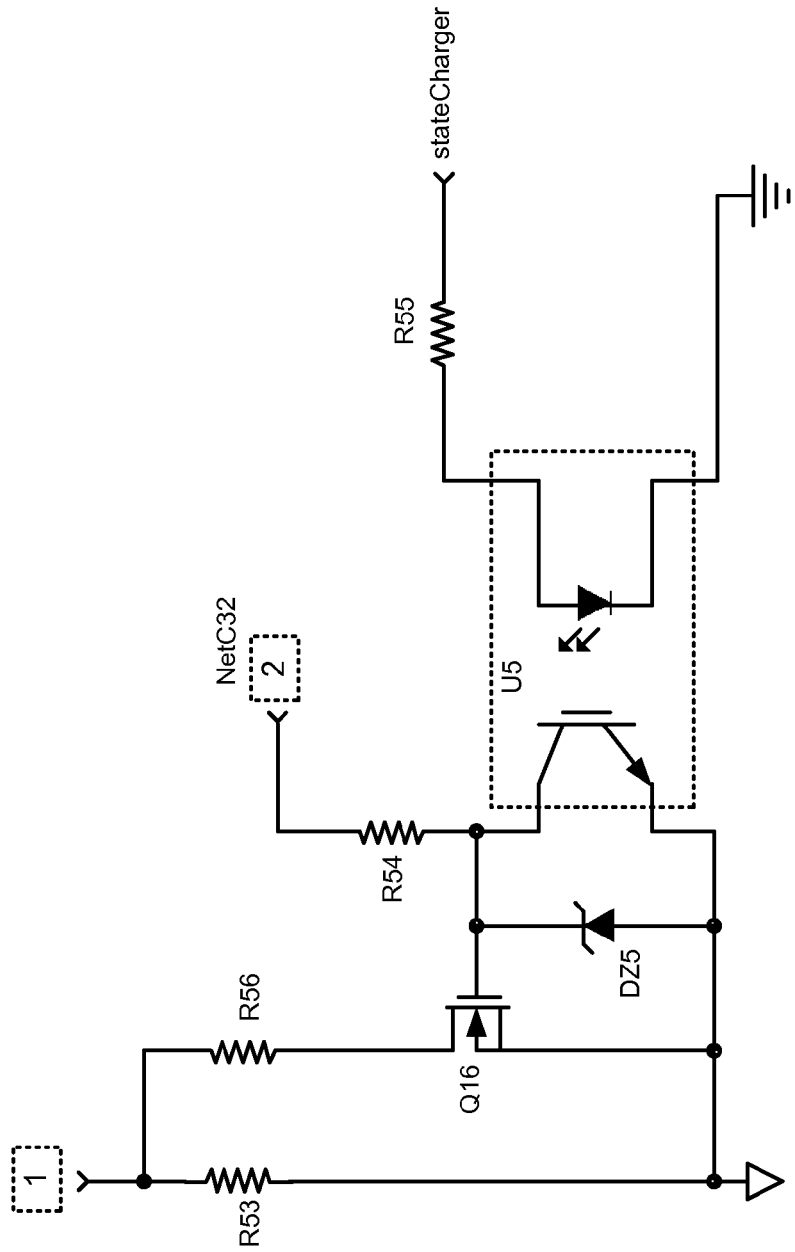
FIG. 4 is a diagram that depicts details of an exemplary implementation of the double rate charger control circuitry of FIG. 2.

Charger controller U4 controls the voltage and current supplied to relay coils 215 and rechargeable battery 130 via isolating transformer T2. Pins 2 and 6 of charger controller U4 are grounded. R51 and C28 connect to pin 3 and act to compensate current loop gain. Pin 1 of charger controller U4 connects current sense resistor R49 to sense the current through MOSFET Q15 for peak-current-mode control in CV mode and output-current regulation in CC mode. R50 and C27 connect to pin 4 and act to compensate voltage loop gain. Pin 5 of charger controller U4 detects the output voltage and discharge time based on the voltage across the auxiliary winding of T2. Pin 5 also connects to divider resistors R46 and R47 and to capacitor C26. Pin 8 of charger controller U4 outputs the Pulse Width Modulated (PWM) signal to drive external MOSFET Q15. The output PWM signal from pin 8 of charger controller U4 turns on or off the supply of battery charging current through resistors R53 and R56 (FIG. 4). The output PWM control signal from pin 8 of charger controller U4 has a repetition rate that is sufficient to maintain, via transformer T2, a relatively stable voltage and current that charges capacitors C31A, C31B, C35 and C34 to, in turn, generate voltage Vo+ that includes the charging voltage for supplying either a high charging rate current or a low charging rate current to rechargeable battery 130. The current through MOSFET Q15, when on, passes through the primary side of T2 to energize the transformer core. Given the reverse polarity of the windings (i.e., secondary relative to primary of T2) and with D13 being reverse biased, there is no energy transfer to the secondary of T2 when MOSFET Q15 is on. When MOSFET Q15 is turned off, the energy accumulated in the transformer core is coupled to the secondary of T2, forward biasing D13, and allowing current to flow through, and recharging, parallel capacitors C31A, C31B, C34 and C35 and generating voltage Vo+ at the connection (depicted with a "3" inside a rectangular box) from capacitors C35 and C34 to one side of diode D6 and relay coils K3A, K4A, K5A, and K2A of relay coils 215 (see FIG. 5). Voltage Vo+ actuates relay contacts 150, and enables power to be supplied to fluorescent light 120 from AC ballast 110. The amount of current supplied through MOSFET Q15 is controlled by double rate charger control circuitry 205, as described further below. Resistor R42, capacitor C24 and diode D10 act as a "snubber circuit," and are active when MOSFET Q15 is turned off to dissipate energy in the primary side of T2.

FIG. 4 depicts details of the circuitry of an exemplary implementation of double rate charger control circuitry 205. Double rate charger control circuitry 205 connects to battery charger 200 via the connection (depicted with a "1" inside a rectangular box) at the drain of MOSFET Q15 (see FIG. 3) that connects to resistors R53 and R56 (FIG. 4). The current, for charging battery 130, flows through R56 and/or R53. The values of R56 and R53 determine a quantity of charging current supplied to battery 130. Resistor R53 sets a low rate charging current and resistor R56 sets a high rate charging current. The supply voltage applied to pin 7 of charger controller U4 may also be applied via the connection (depicted with a "2" inside a rectangular box) to resistor R54 for supplying current through U5 and zener diode DZ5. Upon application of a control signal "stateCharger" from controller 210 (see FIG. 9 below) to resistor R55, the signal is coupled from resistor R55 to the gate of MOSFET Q16 via opto-coupler U5 to turn on or off MOSFET Q16. When Q16 is turned off, charging current only flows through resistor R53 (i.e., the low rate charging current). When Q16 is turned on, charging currently flows through resistors R56 and R53 (i.e., the high rate charging current). For example, when Q16 is turned off (i.e., a high control signal "stateCharger"), a current of approximately 220 mA flows through resistor R53 and transistor Q15. As a further example, when Q16 is turned on (i.e., a low control signal "stateCharger"), a total current of approximately 265 mA flows through resistors R53, R56 and transistor Q15. Different resistance values for R53 and R56 may be selected to change the two different charging current rates. A different resistance value for resistor R56 may be selected to change the high charging rate, and a different resistance value for resistor R53 may be selected to change the low charging rate.

Figure 5:
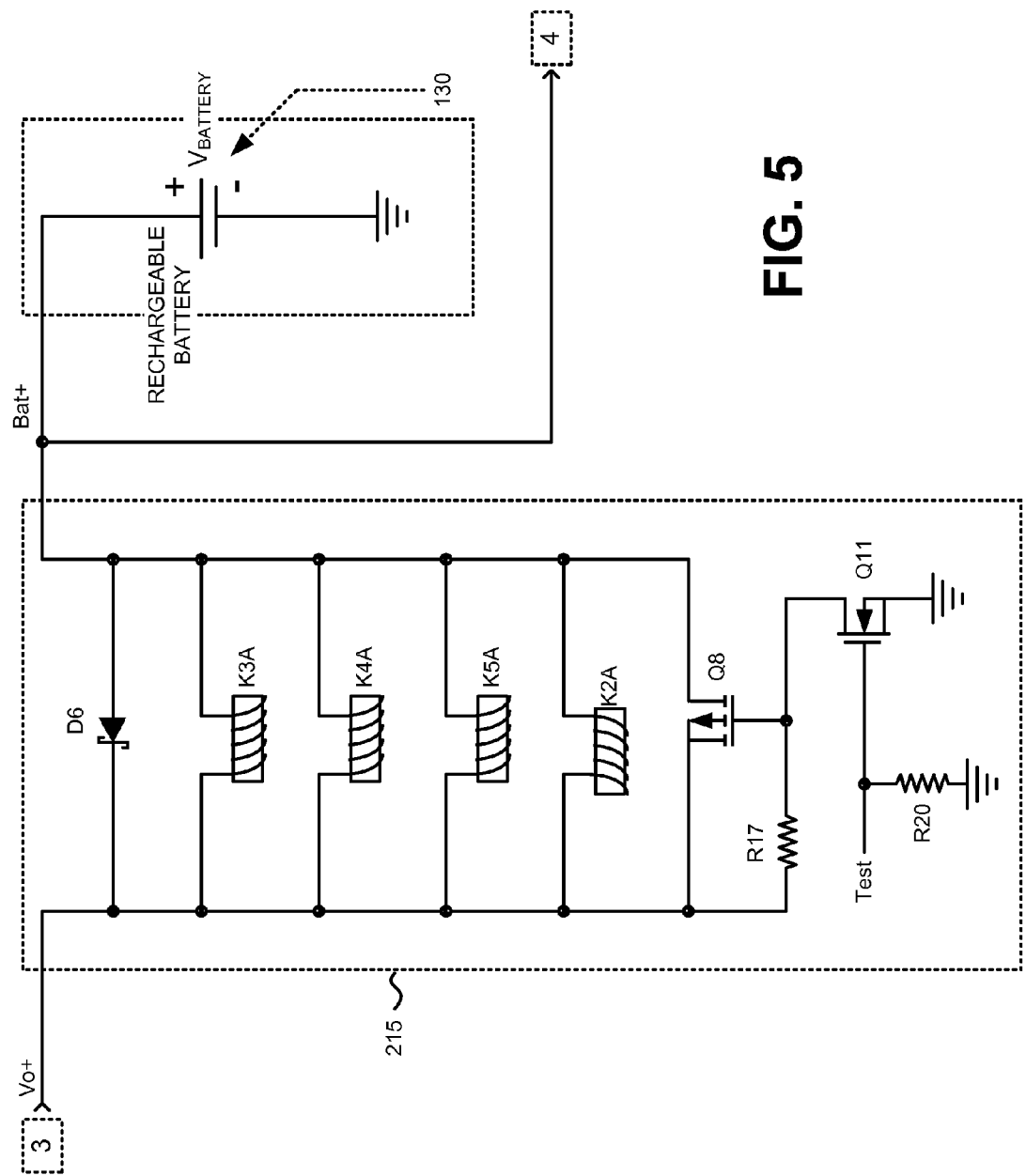
FIG. 5 is a diagram that depicts details of an exemplary implementation of the relay coils of FIG. 2 as connected to the rechargeable battery.

FIG. 5 depicts details of an exemplary implementation of relay coils 215 as connected to rechargeable battery 130. Referring back to FIGS. 3 and 4, the current flow through MOSFET Q15 (FIG. 3) and resistor R53 and/or resistor R56 (FIG. 4) generates a voltage on the primary side of T2 (FIG. 3), which, when MOSFET Q15 is turned from on to off based on the PWM control signal from pin 8 of U4, is coupled across to the secondary side of T2 to power relay coils 215 as voltage Vo+ at the connection (depicted with a "3" inside a rectangular box) from capacitors C35 and C34 to one side of diode D6 and relay coils K3A, K4A, K5A, and K2A of relay coils 215 (FIG. 5). Voltage Vo+, and current supplied by the secondary side of T2, actuates relay contacts 150, enabling the supply of power to fluorescent light 120 via AC ballast 110. The amount of current supplied through MOSFET Q15, and therefore, the voltage level applied to the primary of T2, is controlled by double rate charger control circuitry 205, as described above with respect to FIG. 4. When the voltage difference between voltage Vo+ (at connection "3", FIG. 5) and $V_{battery}$ is large enough, the voltage drop across relay coils K3A, K4A, K5A and K2A, and corresponding current flow through the relay coils, is sufficient to activate relay contacts 150 to enable AC ballast 110 to power fluorescent light 120.

Figure 6:
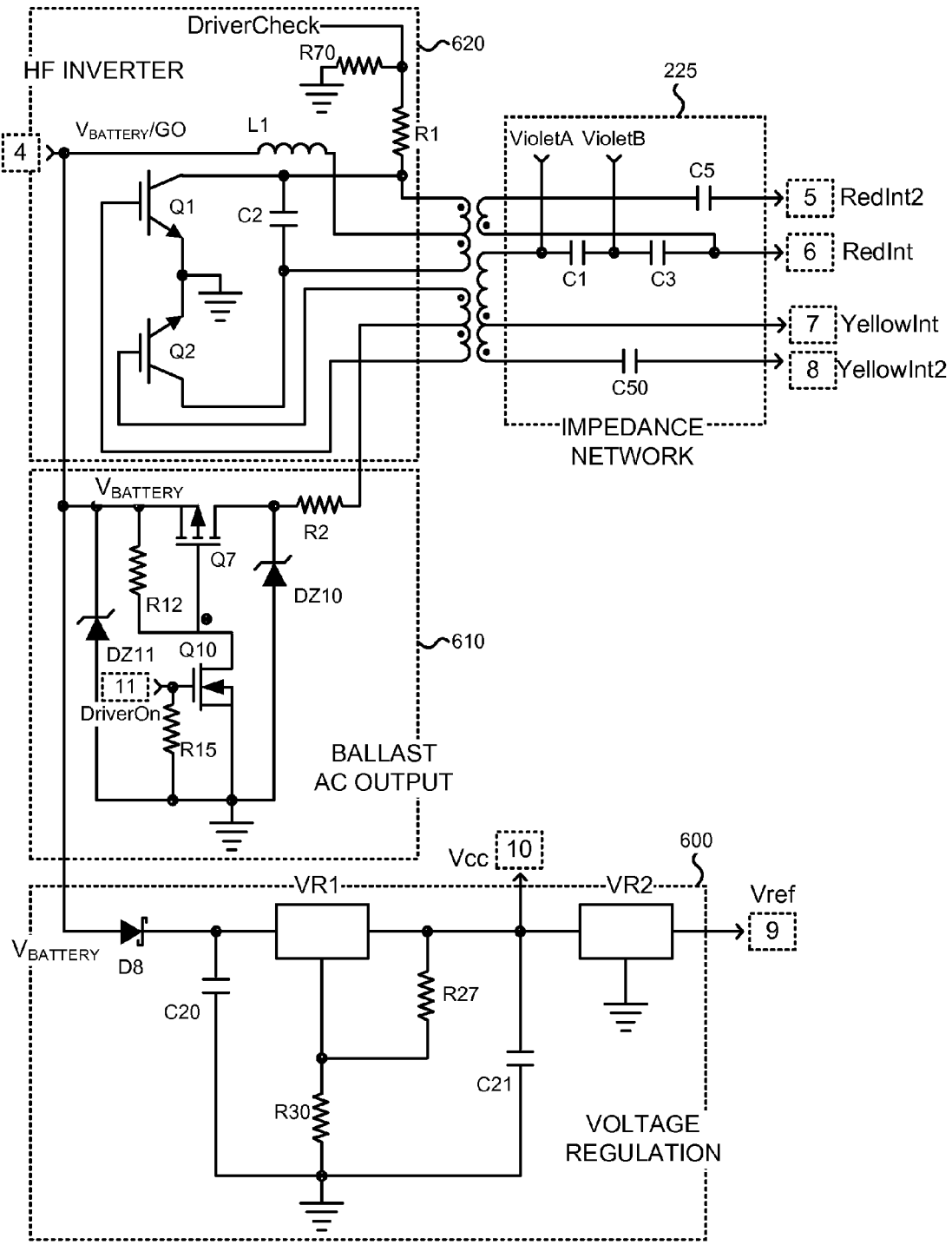
FIG. 6 is a diagram that depicts details of the circuitry of an exemplary implementation of the high frequency inverter circuitry/ballast AC output circuitry and impedance network of FIG. 2.

FIG. 6 depicts details of the circuitry of an exemplary implementation of voltage regulation circuitry 600, ballast AC output circuitry 610 and HF inverter circuitry 620 (of HF inverter/ballast AC output circuitry 220) (depicted in FIG. 2), and impedance network 225. As shown in FIG. 6, voltage regulation circuitry 600 may receive voltage $V_{battery}$ from battery 130 via the connection depicted with a "4" inside a rectangular box. Low voltage linear regulator VR1 receives the voltage $V_{battery}$ via diode D8, and outputs a regulated voltage level Vcc for powering controller 210 via the connection identified by a "10" within a rectangular box. Low voltage linear regulator VR2 receives the voltage Vcc from VR1, and outputs a regulated reference voltage level Vref that is supplied to controller 210 via a connection identified by a "9" within a rectangular box. Controller 210 uses the reference voltage level Vref in its internal Analog-to-Digital converter.

Ballast AC output circuitry 610 may be turned on and off based on control signal "DriverOn" received from controller 210 via the connection identified by a "11" within a rectangular box. Ballast AC output circuitry 610 is turned on by a high "DriverOn" signal at the gate of MOSFET Q10, which drives MOSFET Q7. A high "DriverOn" signal at the gate of MOSFET Q10 causes MOSFET Q7 to turn on which, in turn, causes current to flow through Q7 and resistor R2 initiating the oscillation of transistors Q1 and Q2 of HF inverter circuitry 620. A low "DriverOn" signal at the gate of MOSFET Q10 causes MOSFET Q7 to turn off which, in turn shuts off the flow of current through Q7 and R2, stopping the oscillation of transistors Q1 and Q2, thereby, stopping the operation of HF inverter circuitry 620.

HF inverter circuitry 620, when turned on by ballast AC output circuitry 610, powers fluorescent light 120 via impedance network 225 and relay contacts 150 using a self oscillating technique. Impedance network 225 includes capacitors C1, C3, C5 and C50 whose values may be matched to the type of fluorescent light 120 connected to impedance network 225 via relay contacts 150. The light output of fluorescent light 120 may be adjusted by modifying the capacitors in impedance network 225. Impedance network 225 may connect, via connections identified by a "5," "6," "7," and "8" within rectangular boxes, to relay contacts 150 depicted in FIG. 7. The connections "VioletA" and "VioletB" at each side of capacitor C1 in impedance network 225 may be shorted together (e.g., via an external wire or jumper connected between "VioletA" and "VioletB") to augment power to fluorescent light 120 during, for example, emergency operation.

Figure 7:
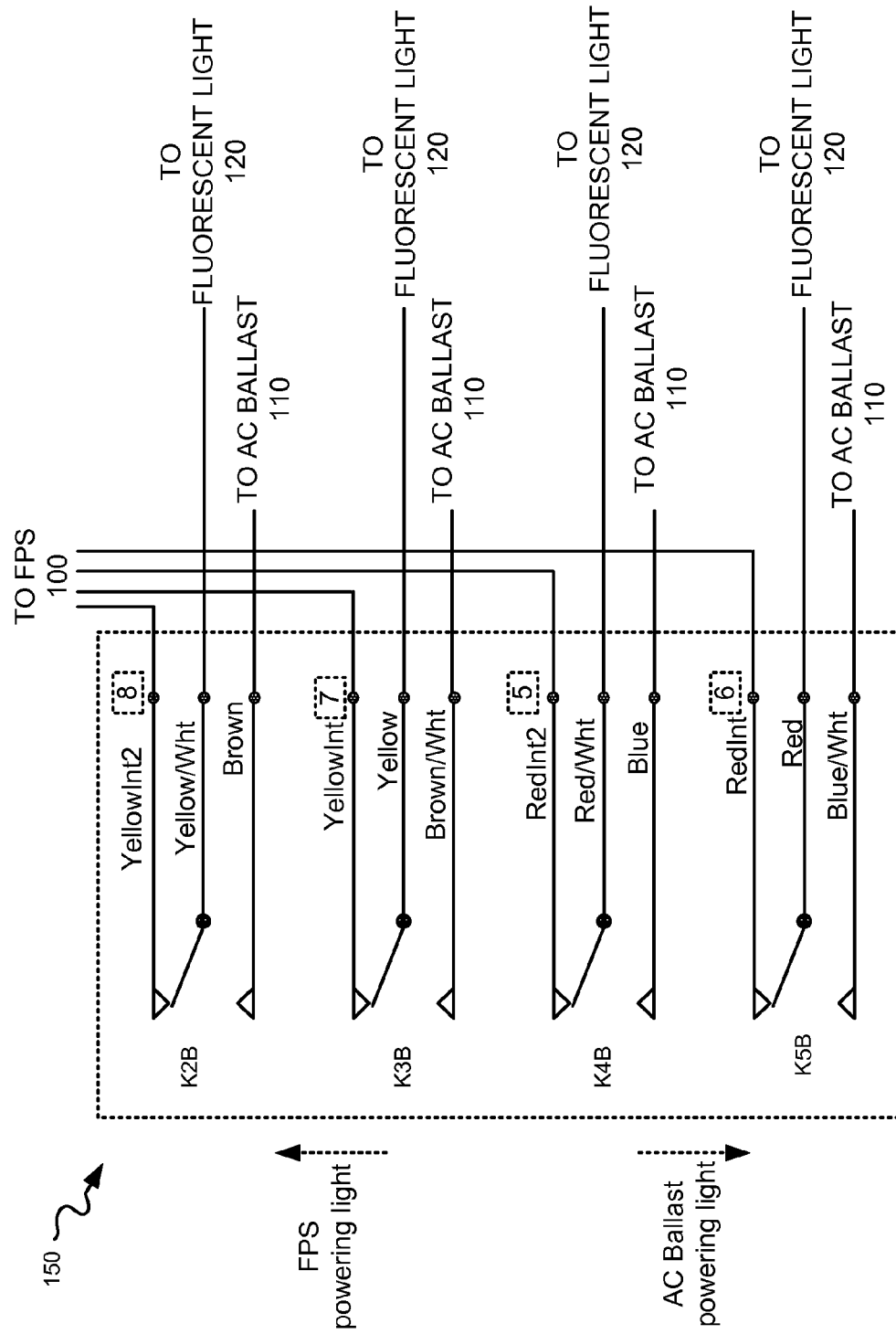
FIG. 7 is a diagram that depicts details of an exemplary interconnection of the relay contacts with the external AC ballast and with the fluorescent power supply of FIG. 2.

FIG. 7 depicts exemplary details of the interconnection of relay contacts 150 with external AC ballast 110 and with FPS 100. As seen in FIG. 7, when the relay contacts 150 are in an upper position (i.e., relay coils 215 unactivated), such as when the AC input power has failed, FPS 100 is connected to fluorescent light 120 so as to provide power to light 120. As depicted in FIG. 6, the connections shown as 5, 6, 7 and 8 within rectangular boxes connect to impedance network 225 for receiving power from FPS 100 for powering fluorescent light 120, instead of AC ballast 110. When the relay contacts 150 are in a lower position of FIG. 7 (i.e., are activated by relay coils 215), such as when AC input power is present, AC ballast 110 is connected to fluorescent light 120 to provide power to light 120.

Figure 8:
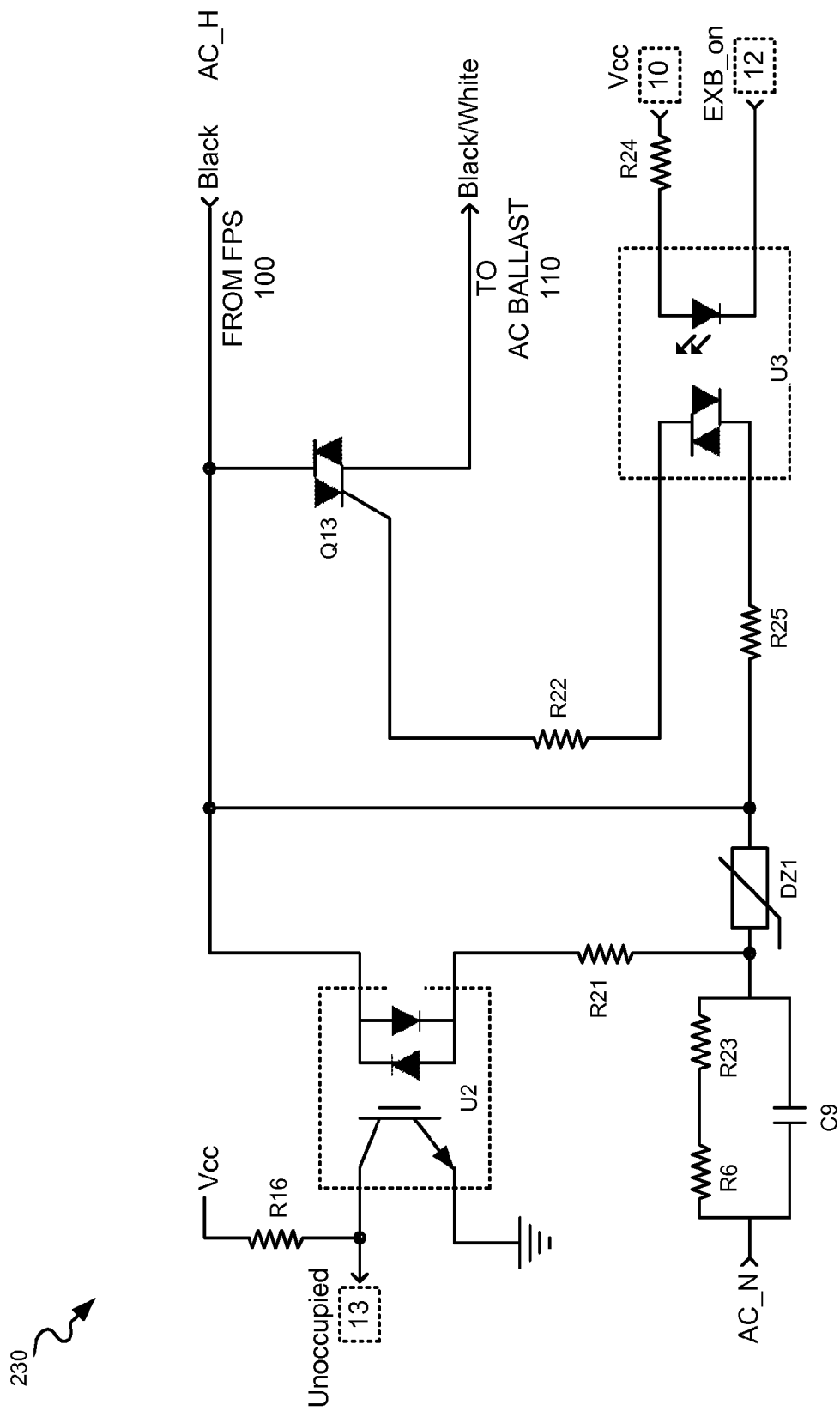
FIG. 8 is a diagram that depicts details of an exemplary implementation of the AC ballast control circuitry of FIG. 2.

FIG. 8 depicts details of an exemplary implementation of AC ballast control circuitry 230. AC ballast control circuitry 230 turns on or off external AC ballast 110 for supplying power to fluorescent light 120 via relay contacts 150. Controller 210 may turn on or off AC ballast 110 via the External Ballast ON (EXB_on) signal connection shown as a "12" within a rectangular box in FIG. 8. When control signal EXB_on is pulled low (logic 0), a current is pulled from Vcc at the signal connection shown as a "10" within a rectangular box in FIG. 8 through the photodiode of opto-coupler U3. The flow of current through the photodiode of opto-coupler U3 turns on the triac of opto-coupler U3 which, in turn, turns on triac Q13. When triac Q13 turns on, the voltage of the AC input power (AC_H at "black") is connected through triac Q13 to be supplied to AC ballast 110 (via "black/white"). When control signal EXB_on is pulled high (logic 1), the photodiode of opto-coupler U3 is placed in an off condition, thereby causing triac Q13 to be put in an off state. With triac Q13 in an off state, AC input power (AC_H) at the "black" input connection is not supplied via triac Q13 to the "black/white" connection, thereby turning AC ballast 110 off.

In AC ballast control circuitry 230, the AC input power neutral connection (AC_N) and the high voltage of the AC input power (AC_H), in combination with resistors R6, R23, R21, R16, capacitor C9 and opto-coupler U2, provide an indication if fluorescent light 120 is turned on and the AC input power is being supplied (i.e., has not failed). When the "black" input is powered (i.e., AC input power is on), then current flows through U2 and R21 causing the voltage level "Unoccupied" at the connection "13" within the rectangular box of FIG. 8 to be pulled low. When fluorescent light 120 is turned off, or the AC input power has failed, then the voltage level "Unoccupied" at connection "13" is pulled high.

Figure 9:
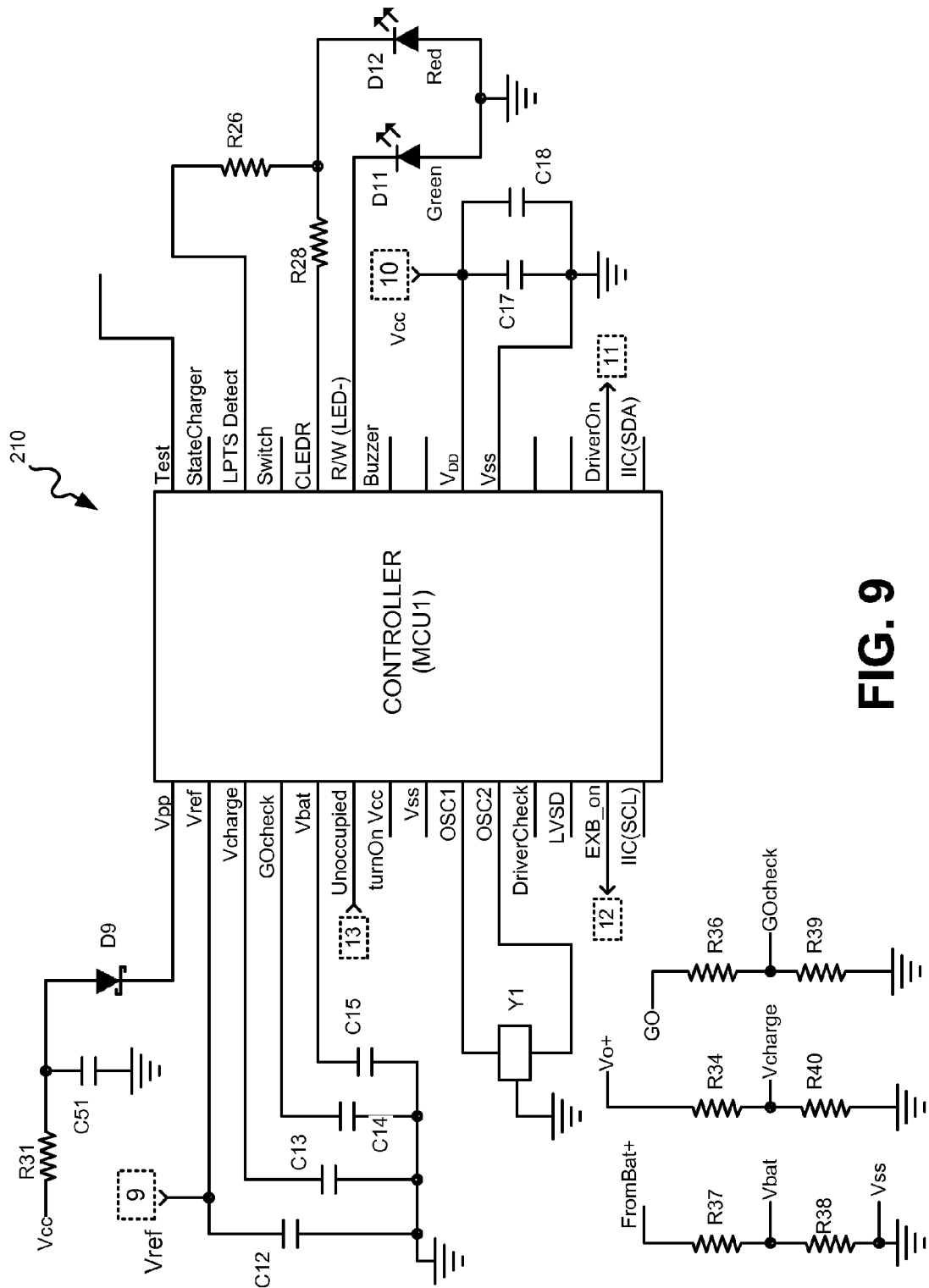
FIG. 9 is a diagram that depicts details of an exemplary implementation of the controller of FIG. 2, and its associated circuitry.

FIG. 9 depicts details of an exemplary implementation of controller 210 and associated circuitry. In the exemplary implementation of FIG. 9, controller 210 includes a programmable 8-bit PIC16F886 microcontroller from Microchip. Other types of controllers, however, may alternatively be used. The associated circuitry with controller 210 includes an oscillator Y1 that sets controller 210's operating frequency via the OSC1 and OSC2 pins. Controller 210 is powered by voltage Vcc provided, from voltage regulation circuitry 600 of FIG. 6, via the connection identified by a "10" within a rectangular box. Controller 210 may, as depicted in FIG. 9, have various different input pins for receiving various different input signals and various different output pins for supplying output control signals to other circuitry within FPS 100. The use of the various output control signals from controller 210 are described further with respect to the applicable portions of circuitry of FPS 100 being controlled. As described below with respect to FIGS. 11-13, controller 210 may determine a low voltage condition on battery 130, an AC input power failure, a forced battery discharge (e.g., due to testing of FPS 100), and/or a battery discharge time during AC input power failure. Controller 210 may control the operation of FPS 100 to select one of multiple different battery charging rates and to select one of multiple different battery charging periods based on a determined low voltage condition, an AC input power failure, a forced battery discharge, and/or battery discharge time.

Figure 10:
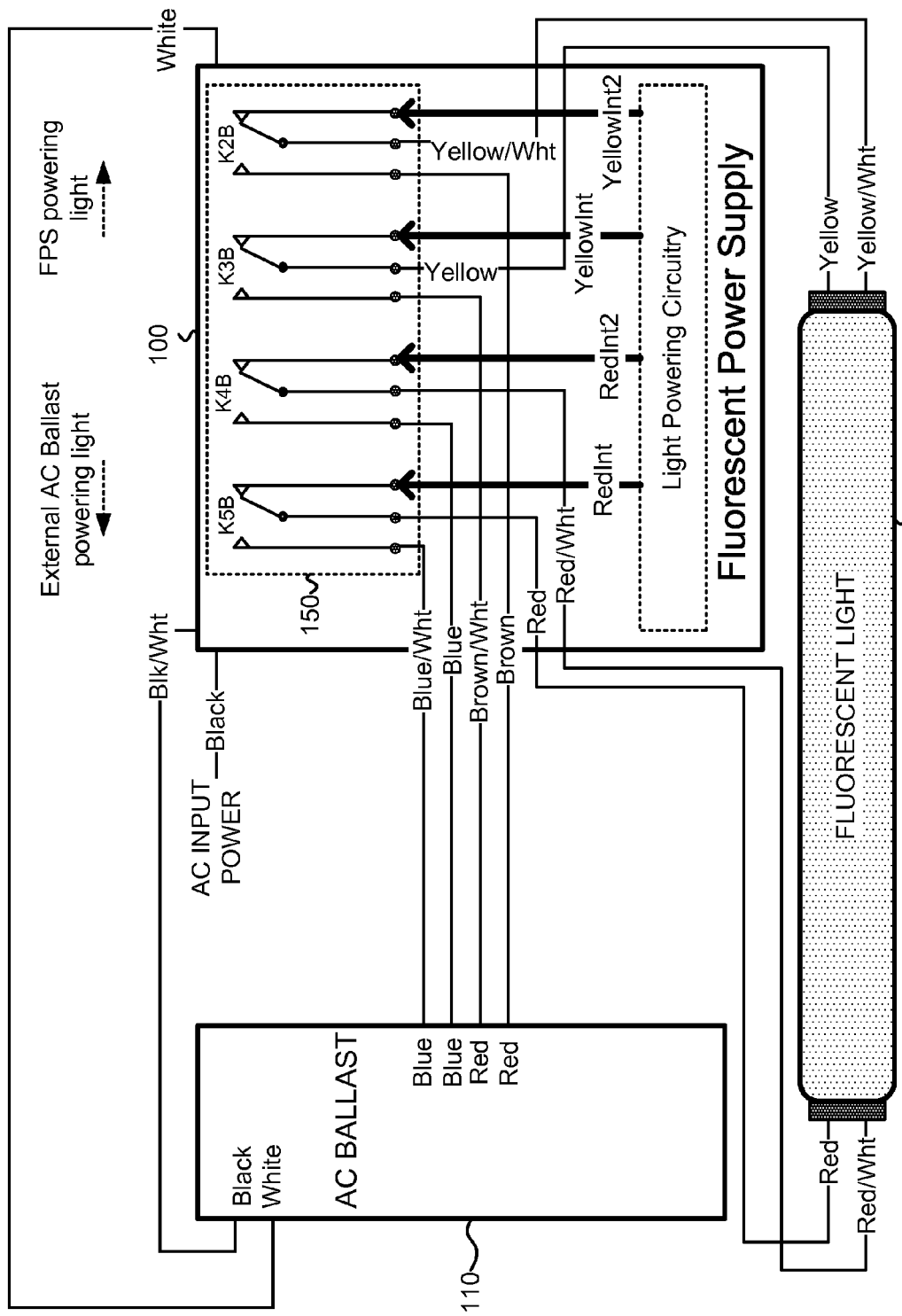
FIG. 10 is a diagram that depicts an overview of the powering of the fluorescent light from the AC ballast or fluorescent power supply of FIG. 1.

FIG. 10 depicts an overview of the powering of fluorescent light 120 from AC ballast 110 or FPS 100 via relay contacts 150. As shown in FIG. 10, AC input power is applied via the "black" input to FPS 100. FPS 100, in turn, selectively supplies power to AC ballast via "white" and "blk/wht" outputs. When the relay coils (not shown) are unactivated (e.g., AC input power has failed) such that the contacts of relay contacts 150 are in the right-wards position shown in FIG. 10, the light powering circuitry of FPS 100 connects to fluorescent light 120 via "RedInt," "RedInt2," "YellowInt," and "YellowInt2" to supply power to light 120 via "Red," "Red/wht," "Yellow," "Yellow/wht," and "Yellow." When relay contacts 150 are activated (e.g., AC input power is present) such that the contacts are in a left-wards position (not shown in FIG. 10), AC ballast 110 supplies power to light 120 via "Blue/Wht," "Blue," "Brown/Wht," and "Brown" from AC ballast 110 and via "Red," "Red/wht," "Yellow," and "Yellow/wh," to fluorescent light 120.

Figure 11:
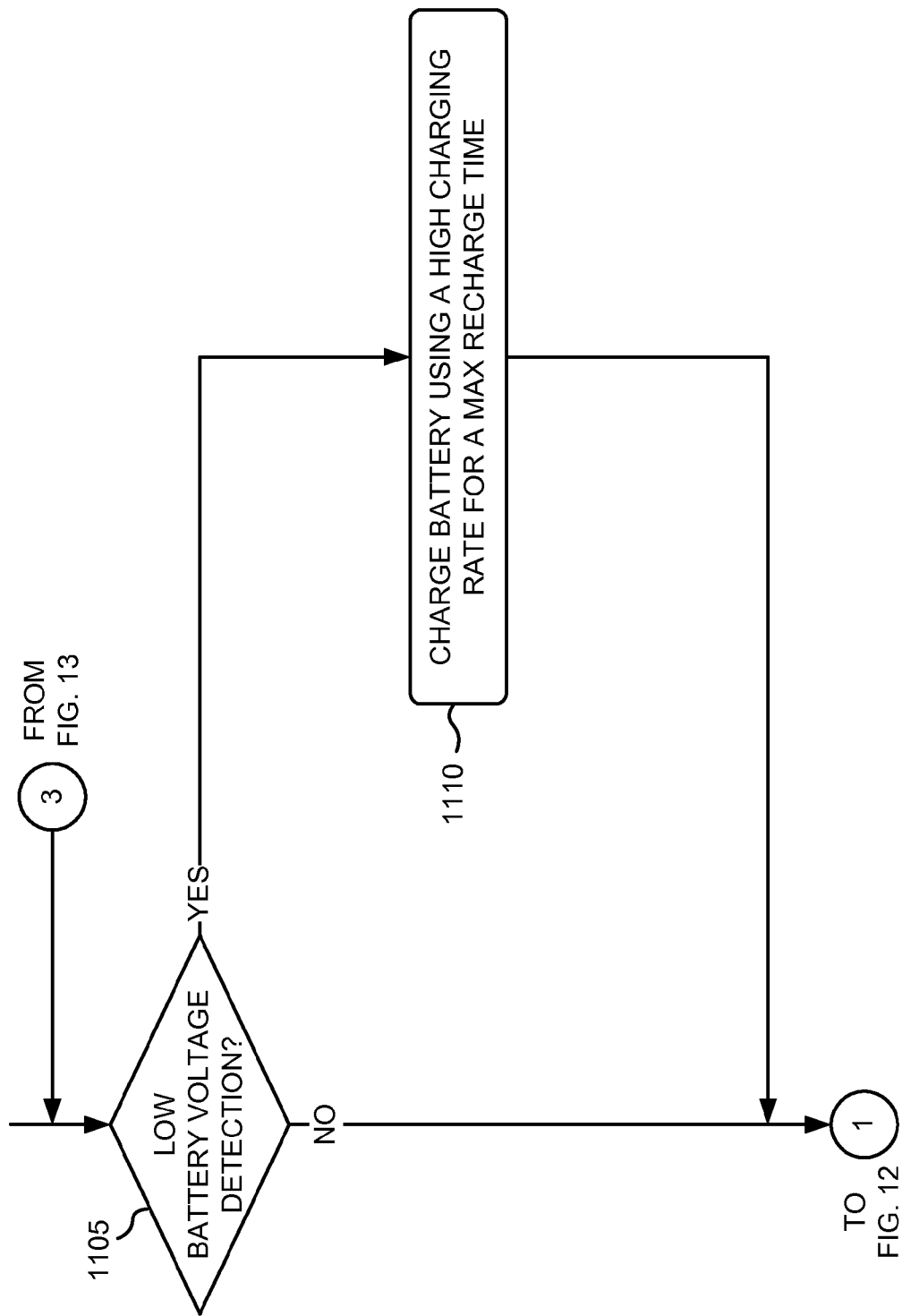
FIGS. 11-13 are flow diagrams that illustrate an exemplary process for the fluorescent power supply to charge a rechargeable battery using a selected one of at least two different charging rates for selected charging periods.
Figure 12:
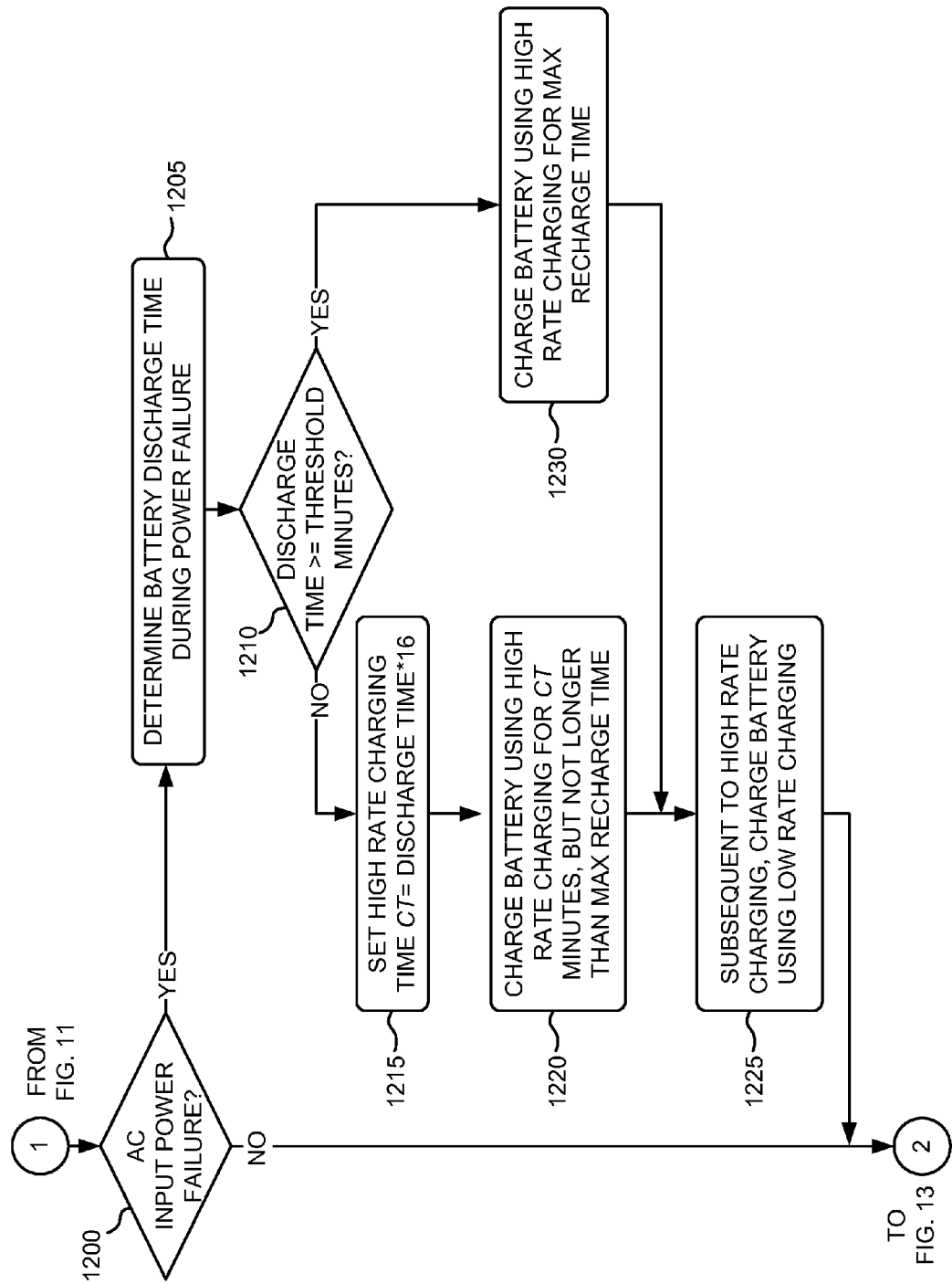
Figure 13:
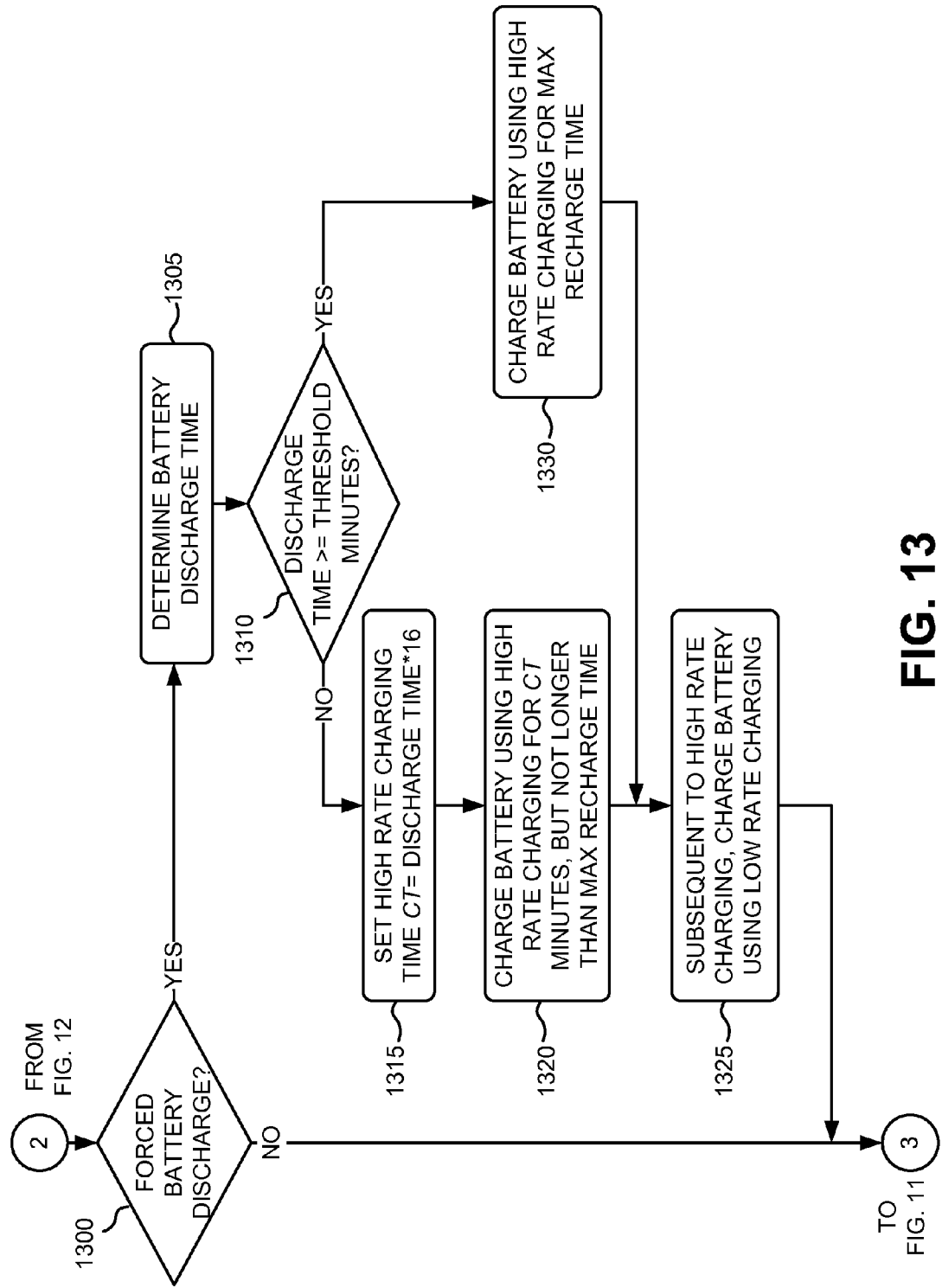

FIGS. 11-13 are flow diagrams that illustrate an exemplary process for charging rechargeable battery 130 of emergency lighting fluorescent power supply 100 using a selected one of at least two different charging rates for selected charging periods. The exemplary process of FIGS. 11-13 may be performed by controller 210 in conjunction with other components of FPS 100, or external AC ballast 110.

The exemplary process may include controller 210 determining if a low battery voltage has been detected at rechargeable battery 130 (block 1105). Controller 210 may monitor a voltage (Vbat—at resistor R38, FIG. 9) indicative of the current battery voltage level. The voltage (Vbat) is proportional to the actual battery voltage (Bat+—FIGS. 5 and 9). If controller 210 determines that a low battery voltage has been detected at battery 130 (YES—block 1105), then controller 210 causes battery 130 to be charged using a high charging rate for a maximum recharge time (block 1110). In one implementation, the maximum recharge time has been specified as 26 hours. Other maximum recharge times may, however, be specified. To charge battery 130 at the high charging rate, controller 210 applies a low "stateCharger" signal at resistor R55 of double rate charger control circuitry 205 (see FIG. 4). Upon application of the low "stateCharger" signal from controller 210 (see FIG. 9), the signal is coupled from resistor R55 to the gate of MOSFET Q16 via opto-coupler U5 to turn on MOSFET Q16. When Q16 is turned on, charging currently flows through both resistors R56 and R53. As an example, when Q16 is turned on (i.e., a low control signal "stateCharger"), a current of approximately 265 mA flows through resistors R53, R56 and transistor Q15 (see FIG. 3). The current flowing through transistor Q15 is coupled, when Q15 is turned from on to off based on the PWM control signal from U4, via transformer T2 to supply a charging voltage Vo+, via capacitors C31A, C31B, C35 and C34, at one side of relay coils K2A, K3A, K4A, and K5A (see FIG. 5), with a corresponding charging current that flows through relay coils K2A, K3A, K4A, and K5A into battery 130. Upon application of the low "stateCharger" signal, controller 210 may initiate an internal timer to time the interval for the maximum recharge time. Upon expiration of the maximum recharge time, as indicated by the internal timer, controller 210 may cause the supply of charging current to battery 130 to be reduced to a low charging rate. To reduce the charging current to a low charging rate, controller 210 applies a high "stateCharger" signal at resistor R55 of double rate charger control circuitry 205 (see FIG. 4). Upon application of the high "stateCharger" signal from controller 210 (see FIG. 9), the signal is coupled from resistor R55 to the gate of MOSFET Q16 via opto-coupler U5 to turn off MOSFET Q16. When Q16 is turned off, charging current flows through resistor R53, and not through resistor R56.

Controller 210 may monitor the charging current flowing into battery 130 by first measuring current values for a voltage (Vcharge—at resistor R40, FIG. 9) indicative of the voltage Vo+ applied at the one side of relay coils K2A, K3A, K4A, and K5A and the voltage (Vbat—at resistor R38, FIG. 9) indicative of the current battery voltage level. The voltage (Vbat) is proportional to the battery voltage (Bat+—FIGS. 5 and 9) and the voltage Vcharge is proportional to voltage Vo+. Controller 210 may calculate the charging current by determining the difference between the Vo+ and Bat+ voltages and dividing the difference value by a fixed resistance value from the known impedance of the parallel connected relays K2A, K3A, K4A, and K5A.

Referring back to FIG. 11, if controller 210 does not detect a low battery voltage at battery 130 (NO—block 1105), then the exemplary process continues at block 1200 (FIG. 12), with controller 210 determining if an AC input power failure has occurred. Controller 210 may monitor the AC input power voltage level to identify whether a sufficient voltage level exists. If an AC input power failure has occurred (YES—block 1200), then controller 210 determines a length of time that battery 130 has discharged (i.e., the discharge time or discharge period), between the instant the AC input power failed and until the AC input power resumed, to power fluorescent light 120 (block 1205). Controller 210 may initiate an internal timer at the instant an insufficient voltage level at the AC input power is determined to exist. The internal timer may continue to count until a sufficient voltage level at the AC input power is detected again. The value for the internal timer (in minutes/seconds) at the instant that a sufficient voltage level is detected at the AC input power is the battery discharge time.

Controller 210 determines if the discharge time is greater than or equal to a threshold number of minutes (block 1210). In one implementation, the threshold number of minutes may be sixty minutes. In other implementations, different lengths of a threshold time may be alternatively used. If the discharge time is less than the threshold number of minutes (NO—block 1210), then controller 210 sets a high rate charging time (CT) equal to the determined discharge time multiplied by a fixed factor (block 1215). In one implementation, the fixed factor may be a constant value, such as, for example, a constant value of 16. Controller 210 may cause battery 130 to be charged using a high charging rate for the high rate charging time (CT), but not longer than the specified maximum recharge time (see block 1110 above) (block 1220). Controller 210 may cause battery 130 to be charged using the high charging rate for at least a minute regardless of the high rate charging time (CT) that happens to be set to ensure that sufficient current is initially available to cause relays coils K2A, K3A, K4A and K5A to activate the corresponding relay contacts 150.

To charge battery 130 at the high charging rate, controller 210 applies a low "stateCharger" signal at resistor R55 of double rate charger control circuitry 205. Upon application of the low "stateCharger" signal (see FIG. 9), the signal is coupled from resistor R55 to the gate of MOSFET Q16 via opto-coupler U5 to turn on MOSFET Q16. When Q16 is turned on, charging currently flows through both resistors R56 and R53. As an example, when Q16 is turned on (i.e., a low control signal "stateCharger"), a current of approximately 265 mA flows through resistors R53, R56 and transistor Q15. The current flowing through transistor Q15 is coupled, when Q15 is turned from on to off via the PWM control signal from U4, via transformer T2 to supply a charging voltage Vo+ at one side of relay coils K2A, K3A, K4A, and K5A (FIG. 5), with a corresponding charging current that flows through relay coils K2A, K3A, K4A, and K5A into battery 130. Upon application of the low "stateCharger" signal, controller 210 may initiate an internal timer to time the interval for the high rate charging time (CT).

Subsequent to the high rate charging of battery 130 during the high rate charging time, controller 210 may cause battery 130 to be charged using low rate charging (block 1225). Upon expiration of the high rate charging time (CT), as indicated by the internal timer, controller 210 may apply a high "stateCharger" signal to resistor R55 (see FIG. 9) and the signal is coupled from resistor R55 to the gate of MOSFET Q16 via opto-coupler U5 to turn off MOSFET Q16. When Q16 is turned off, the current flowing through resistor R56 ceases to flow such that only charging current through R53 continues to flow. As an example, when Q16 is turned off (i.e., a high control signal "stateCharger"), a current of approximately 220 mA flows through resistor R53 and transistor Q15. The current flowing through transistor Q15 is coupled, when Q15 is turned from on to off based on the PWM control signal from U4, via transformer T2 to supply a charging voltage Vo+ at one side of relay coils K2A, K3A, K4A, and K5A (FIG. 5), with a corresponding charging current that flows through relay coils K2A, K3A, K4A, and K5A into battery 130. The exemplary process may continue at block 1300 (FIG. 13).

Returning to block 1210, if controller 210 determines that the discharge time is greater than or equal to the threshold number of minutes (YES—block 1210), then controller 210 causes battery 130 to be charged using the high rate charging for the maximum recharge time (block 1230). Similar to block 1110 above, to charge battery 130 at the high charging rate, controller 210 applies a low "stateCharger" signal at resistor R55 of double rate charger control circuitry 205. Upon application of the low "stateCharger" signal (see FIG. 9), the signal is coupled from resistor R55 to the gate of MOSFET Q16 via opto-coupler U5 to turn on MOSFET Q16. When Q16 is turned on, charging currently flows through both resistors R56 and R53. As an example, when Q16 is turned on (i.e., a low control signal "stateCharger"), a current of approximately 265 mA flows through resistors R53, R56 and transistor Q15. The current flowing through transistor Q15 is coupled, when Q15 is turned from on to off based on the PWM control signal from U4, via transformer T2 to supply a charging voltage Vo+ at one side of relay coils K2A, K3A, K4A, and K5A (FIG. 5), with a corresponding charging current that flows through relay coils K2A, K3A, K4A, and K5A into battery 130. Upon application of the low "stateCharger" signal, controller 210 may initiate an internal timer to time the interval for the maximum recharge time (e.g., 26 hours). Upon expiration of the maximum recharge time, as indicated by the internal timer, controller 210 may cause the supply of charging current to battery 130 to be reduced to the low charging rate (block 1225—as described above). The exemplary process then continues at block 1300 (FIG. 13).

Referring to FIG. 13, at block 1300, controller 210 determines if battery 130 has undergone a forced discharge. Controller 210 may test FPS 100 by initiating a testing of battery 130 discharging and charging. If controller 210 determines that battery 130 has not undergone a forced discharge (NO—block 1300), then the process may return to block 1100 (FIG. 11) to loop through the process of FIGS. 11-13 again. If battery 130 has undergone a forced discharge (YES—block 1300), then controller 210 determines a length of time that battery 130 discharged (i.e., the discharge time) (block 1305). Block 1305 is performed similarly to block 1205 as described above.

Controller 210 determines if the discharge time is greater than or equal to a threshold number of minutes (block 1310). In one implementation, the threshold number of minutes may be sixty minutes. In other implementations, different lengths of discharge time may be alternatively used. If the discharge time is less than the threshold number of minutes (NO—block 1310), then controller 210 sets a high rate charging time (CT) equal to the determined discharge time multiplied by a fixed factor (block 1315). In one implementation, the fixed factor may be a constant value, such as, for example, a constant value of 16. Block 1315 may be performed similarly to block 1215 described above. Controller 210 may cause battery 130 to be charged using a high charging rate for the high rate charging time (CT), but not longer than the specified maximum recharge time (see block 1110 above) (block 1320). Controller 210 may cause battery 130 to be charged using the high charging rate for at least a minute regardless of the high rate charging time (CT) that happens to be set. Block 1320 may be performed similarly to block 1220 described above.

Subsequent to the high rate charging of battery 130 during the high rate charging time, controller 210 may cause battery 130 to be charged using low rate charging (block 1325). Block 1325 may be performed similarly to block 1225 described above. The exemplary process may return to block 1100 (FIG. 11) to loop again through the process depicted in FIGS. 11-13.

Returning to block 1310, if controller 210 determines that the discharge time is greater than or equal to the threshold number of minutes (YES—block 1310), then controller 210 causes battery 130 to be charged using the high rate charging for the maximum recharge time (block 1330). Block 1330 may be performed similarly to block 1230 described above. Upon expiration of the maximum recharge time, as indicated by the internal timer, controller 210 may cause the supply of charging current to battery 130 to be reduced to the low charging rate (block 1325—as described above) The exemplary process may then return to block 1100 (FIG. 11) to loop again through the process depicted in FIGS. 11-13.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 11, 12 and 13 the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims. For example, the configuration of components depicted in FIGS. 1-10 is for illustrative purposes. Other circuitry configurations may be implemented. Therefore, the circuitry depicted in FIGS. 1-10 may include additional, fewer and/or different components that may be configured in a different arrangement than those arrangements depicted.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A power supply, comprising:
    a rechargeable battery;
    circuitry comprising a first circuit path that includes a first resistor connected in parallel with a second circuit path that includes a second resistor, wherein the second circuit path further includes a transistor connected in series with the second resistor, wherein the first circuit path supplies a first current for charging the rechargeable battery and wherein the second circuit path selectively supplies, via the transistor, a second current for charging the rechargeable battery; and
    a controller configured to:
        determine a failure in external input power to an external load,
        determine an amount of time the rechargeable battery discharges to supply power to the external load between the failure of the input power to resumption of the input power,
        if the amount of time is less than a threshold, turning on the transistor to cause both the first circuit path and the second circuit path to supply the first and the second current for charging the battery for a first charging period that is proportional to the amount of time, and turning off the transistor to cause only the first circuit path, and not the second circuit path, to supply the first current subsequent to an end of the first charging period, and
        if the amount of time is greater than or equal to the threshold, turning on the transistor to cause the first circuit path and the second circuit path to supply the first and the second current for charging the battery for a second charging period.

2. The power supply of claim 1, wherein the external load comprises a fluorescent light and wherein the power supply is a component of an emergency lighting system for providing back-up power to the fluorescent light.

3. The power supply of claim 1, wherein the first charging period comprises at least one minute.

4. The power supply of claim 1, wherein the second charging period comprises a period greater than or equal to twenty six hours.

5. The power supply of claim 1, wherein the threshold comprises sixty minutes.

6. The power supply of claim 1, wherein, when turning on the transistor to cause both the first circuit path and the second circuit path to supply the first and the second current for charging the battery for the first charging period, the controller is further configured to:
    multiply the amount of time by a fixed factor to determine the first charging period.

7. The power supply of claim 6, wherein the fixed factor comprises sixteen.

8. The power supply of claim 1, wherein the external load comprises a fluorescent light.

* * * * *